(12) United States Patent
Morard

(10) Patent No.: US 8,731,060 B2
(45) Date of Patent: May 20, 2014

(54) VIDEO ENCODING SYSTEM AND METHOD

(75) Inventor: Jean-Pierre Morard, Rueil-Malmaison (FR)

(73) Assignee: Sagemcom Broadband SAS, Rueil-Malmaison (FR)

( * ) Notice: Subject to any disclaimer, the term of this patent is extended or adjusted under 35 U.S.C. 154(b) by 347 days.

(21) Appl. No.: 13/142,551

(22) PCT Filed: Nov. 16, 2009

(86) PCT No.: PCT/FR2009/052193
§ 371 (c)(1),
(2), (4) Date: Jul. 13, 2011

(87) PCT Pub. No.: WO2010/076439
PCT Pub. Date: Jul. 8, 2010

(65) Prior Publication Data
US 2011/0268191 A1      Nov. 3, 2011

(30) Foreign Application Priority Data

Dec. 30, 2008   (FR) ...................................... 08 59113

(51) Int. Cl.
| | |
|---|---|
| *H04N 7/12* | (2006.01) |
| *H04N 7/36* | (2006.01) |
| *H04N 7/50* | (2006.01) |
| *H04N 7/26* | (2006.01) |
| *H04N 21/2365* | (2011.01) |

(52) U.S. Cl.
CPC ............... *H04N 7/362* (2013.01); *H04N 7/361* (2013.01); *H04N 7/50* (2013.01); *H04N 7/26941* (2013.01); *H04N 21/2365* (2013.01)
USPC ............. 375/240.16; 375/240.01; 375/240.26

(58) Field of Classification Search
CPC .................................. H04N 7/50; H04N 7/362
USPC ......................................... 375/240.16, 240.01
See application file for complete search history.

(56) References Cited

U.S. PATENT DOCUMENTS 5,864,681 A * 1/1999 Proctor et al. ................. 709/247
7,039,245 B1 * 5/2006 Hamery ........................ 382/233
(Continued)

FOREIGN PATENT DOCUMENTS

| EP | 1 377 040 | 1/2004 |
|---|---|---|
| EP | 1 991 004 | 11/2008 |
| WO | WO 2004/013985 | 2/2004 |

OTHER PUBLICATIONS

International Search Report as issued for PCT/FR2009/052193.

*Primary Examiner* — Andy Rao
*Assistant Examiner* — Shan Elahi
(74) *Attorney, Agent, or Firm* — Pillsbury Winthrop Shaw Pittman LLP

(57) ABSTRACT

A video encoding system for encoding consecutive images, the encoding of a current image being done with respect to a previous and/or subsequent image, the encoding system including a reception module to receive the current image to be encoded and to receive a non-estimated real motion vector of a moved area of the current image; a divider to divide the current image into macroblocks; a module to estimate motion vectors depending on the macroblocks of the current image and on the previous and/or subsequent image; a motion compensation module to receive motion vectors and to provide a predicted area; a module to allocate the non-estimated real motion vector to the macroblocks belonging to the moved area; a module to transmit the non-estimated real motion vector directly to the motion compensation module without any estimation of the motion vectors by the estimation module for macroblocks belonging to the moved area.

15 Claims, 1 Drawing Sheet

(56) References Cited

U.S. PATENT DOCUMENTS

| | | | |
|---|---|---|---|
| 7,321,626 B2 | 1/2008 | Sun | |
| 7,444,026 B2 * | 10/2008 | Fujimoto | 382/236 |
| 7,738,556 B2 * | 6/2010 | Nakamura et al. | 375/240.16 |
| 7,924,920 B2 * | 4/2011 | Hsu et al. | 375/240.15 |
| 7,970,966 B1 * | 6/2011 | Hobbs | 710/72 |
| 8,108,577 B1 * | 1/2012 | Hobbs | 710/72 |
| 8,265,161 B2 * | 9/2012 | Bernard et al. | 375/240.19 |
| 8,290,288 B2 * | 10/2012 | Lin et al. | 382/236 |
| 2001/0017978 A1 * | 8/2001 | Nagasawa | 386/111 |
| 2003/0160814 A1 * | 8/2003 | Brown | 345/732 |
| 2003/0174768 A1 * | 9/2003 | Hall et al. | 375/240.01 |
| 2004/0028133 A1 * | 2/2004 | Subramaniyan et al. | 375/240.16 |
| 2005/0013592 A1 * | 1/2005 | Umemura et al. | 386/96 |
| 2005/0031036 A1 * | 2/2005 | Bjontegaard | 375/240.13 |
| 2005/0094974 A1 * | 5/2005 | Nagasawa | 386/95 |
| 2005/0259739 A1 * | 11/2005 | Nakamura et al. | 375/240.16 |
| 2005/0265452 A1 * | 12/2005 | Miao et al. | 375/240.16 |
| 2006/0050971 A1 * | 3/2006 | Page et al. | 382/232 |
| 2006/0098953 A1 * | 5/2006 | Nagasawa | 386/111 |
| 2006/0239353 A1 * | 10/2006 | De Haan et al. | 375/240.16 |
| 2006/0279634 A1 * | 12/2006 | Onno et al. | 348/207.1 |
| 2007/0291839 A1 * | 12/2007 | Yeh | 375/240.12 |
| 2008/0123747 A1 * | 5/2008 | Lee et al. | 375/240.16 |
| 2008/0204598 A1 * | 8/2008 | Maurer et al. | 348/584 |
| 2009/0013084 A1 * | 1/2009 | Canu et al. | 709/229 |
| 2009/0097571 A1 * | 4/2009 | Yamada et al. | 375/240.25 |
| 2009/0219401 A1 * | 9/2009 | Drouot | 348/208.4 |
| 2010/0235583 A1 * | 9/2010 | Gokaraju et al. | 711/133 |
| 2010/0332613 A1 * | 12/2010 | Brakensiek | 709/217 |
| 2012/0102209 A1 * | 4/2012 | Fok et al. | 709/228 |

* cited by examiner

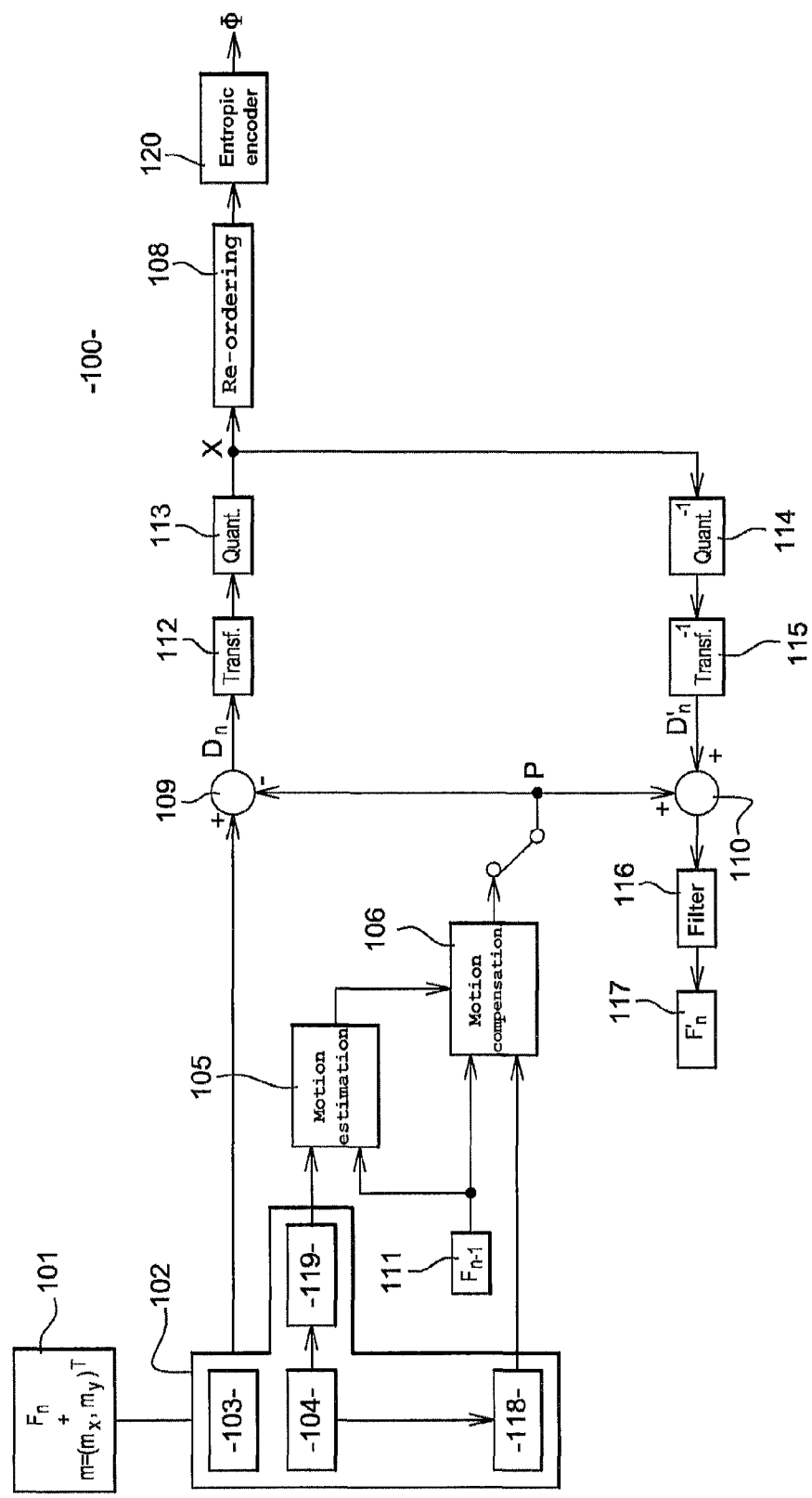

VIDEO ENCODING SYSTEM AND METHOD

CROSS REFERENCE TO RELATED APPLICATIONS

This application is the U.S. National Stage of PCT/FR2009/052193, filed Nov. 16, 2009, which in tuna claims priority to French Patent Application No. 0859113, filed Dec. 30, 2008, the entire contents of all applications are incorporated herein by reference in their entireties.

TECHNICAL FIELD OF THE INVENTION

The present invention relates to a video encoding system. It also has as an object, a video encoding method. The invention can be used in the field of video data broadcasting from a server to a client terminal. The server, which is generally a computer, is connected to the client terminal, such as for example a video decoder, through a network, for example a High Definition Multimedia Interface (HDMI), WIFI or Ethernet type network. In this way, the computer screen may be displayed by the client terminal on a TV screen according to a Remote Frame Buffer type protocol, for example VNC (Virtual Network Computing) protocol.

TECHNOLOGICAL BACKGROUND OF THE INVENTION

In such architecture, the server encodes, that is, compresses, what it broadcasts before sending it to the client terminal. If the server had to display on an own screen the images it broadcasts, their compression would not be necessary. To perform compressing, the server carries out a capture of its own display, codes it and sends it through the network to the client terminal. Each image to be displayed is stored in a buffer, known as framebuffer, of the server and is generally coded in an RGB format ("Red Green Blue") which constitutes the most direct manner to encode the images, the three plans corresponding to the three elementary colors red, green and blue. Then, the image is generally transformed in a YUV format (or luminance-chrominance). The first plan, called luminance plan (Y) represents the luminous intensity of the pixels. The two following plans correspond to the chrominance (U, V) and carry the color information. There mainly exist two YUV formats:
  format 4:2:0 (also known as YUV12) for which both chrominance plans each contain one a sample per four pixels,
  format 4:4:4 for which the three plans have the same size (i.e. there is a chrominance sample per pixel).

The encoding carried out by the server is a space-time type encoding such as a H264 encoding. The H264 standard is a video coding standard jointly developed by the VCEG ("Video Coding Experts Group") and the MPEG ("Moving Pictures Experts Group"). This standard makes it possible to encode video streams with a speed lower than twice less that obtained by the MPEG2 standard for the same quality. A space-time encoding encodes integrally only a portion of the images to be transmitted in order to reconstitute a video. The H264 standard includes the types of image known and defined in the MPEG2 standard, namely:
  I images (Intra), the coding of which does not depend on any other image,
  P images (Predictive), the coding of which depends on previously received images,
  B images (Bi-predictive), which depend on previously and/or subsequently received images.

However, the implementation of such an encoding solution raises a number of difficulties when it comes to the real time transfer of the server display on the client terminal.

Thus, such a coding mode is very much consuming in terms of time and of computation means. To save band-width, the data must be compressed as much as possible. This important compression imposes a great complexity in terms of encoding. Thus, the server must not only carry out image compression but also carry out several computations to determine the addresses and the data to be encoded. This energy overconsumption makes the implementation of other applications running on the same server delicate.

GENERAL DESCRIPTION OF THE INVENTION

In this context, the aim of the present invention is to provide a space-time video encoding system making it possible to reduce the encoding load for a use according to a real-time client-server protocol while leaving enough resources on the server dealing with the encoding for running other applications.

To this end, the aim of the invention is to provide a video encoding system for encoding consecutive images of a video sequence, the encoding of at least one current image being operated with respect to at least one previous and/or subsequent image of said video sequence, said encoding system comprising:
  an input data reception module for receiving said current image to be encoded,
  means for dividing said current image into macroblocks,
  a module for estimating motion vectors depending on the macroblocks of said current image and on said at least one previous and/or subsequent image,
  a motion compensation module receiving motion vectors and providing at least one predicted area,
  said encoding system being characterized in that said data reception module further receives a non estimated real motion vector of at least one moved area of said current image, said encoding system including:
    means for allocating said non estimated real motion vector to the macroblocks belonging to said moved area;
    means for transmitting said non estimated real motion vector directly to said compensation module without any estimation of the motion vectors by said estimation module for said macroblocks belonging to said moved area.

The term macroblock, refers to an elementary rectangular area of the image having a size comprised between 4×4 and 16×16 pixels (while going through 8×16, 8×8 pixels, . . . ). Each macroblock being itself composed of luminance blocks and chrominance blocks.

The motion estimation during a space-time encoding is an operation which requires a very high computing power. The system according to the invention makes it possible to avoid part of this estimation by advantageously using the provision of an already existing motion vector.

Thanks to the invention, the provision of the motion vector relating to an area (typically a rectangle inside an image or frame) having undergone a displacement makes it possible not to calculate the motion vectors for the macroblocks which are located in such a moved area. The real motion vector is directly injected at the input of the compensation module.

Thus, the encoding load is particularly reduced compared to a typical space-time encoding.

Interestingly, the encoding system may be used in the case where initiation of the area displacement is carried out at a client terminal connected to a server via a VNC protocol, the terminal screen displaying the rendering of the displacement. Encoding by the system according to the invention is carried out at the server and the real vector of the displaced area is provided by a programming interface of the server graphical environment.

In addition to the reduced encoding load, it will be appreciated that, thanks to the invention, the rendering will be improved since real and not estimated motion vectors are, at least partly, used.

Typically, such a real motion vector for an area undergoing a displacement may be obtained in the frame of applications such as:
- horizontal or vertical scrolling of the moved area with a browser type application;
- displacement of a graphical window of the server operating system;
- transition from a slide to another in the case of a slideshow;
- flash or Silverlight type animation.

The system according to the invention may also have one or more of the characteristics below, considered individually or in any technically possible combination:
- the system according to the invention comprises means for only transmitting the macroblocks not belonging to said moved area to said module for estimating motion vectors;
- a subtracter for carrying out the difference between the pixels of the current image and the predicted area and for providing a residual error corresponding to this difference;
- a frequency transform module applying a frequency transform on each macroblock processed by said estimation module as well as on said residual error;
- a module for quantifying data from said frequency transform module;
- an entropic encoder for encoding data from said quantification module.

Another object of the present invention is a video encoding method for encoding consecutive images of a video sequence, the encoding of at least one current image being operated with respect to at least one previous and/or subsequent image of said video sequence, said method comprising the steps of:
- receiving said current image to be encoded and a non estimated real motion vector of at least one moved area of said current image,
- dividing said current image into macroblocks,
- allocating said non estimated real motion vector to the macroblocks belonging to said moved area,
- estimating motion vectors depending on the macroblocks of said current image and of said at least one previous and/or subsequent image, said estimation being made only from the macroblocks not belonging to said moved area,
- said current image to be encoded being transmitted from a server to a client terminal, the encoding being carried out at the server and said non estimated real vector of at least one moved area of said current image being provided by a programming interface of the graphical environment of said server.

The method according to the invention may also have one or more of the characteristics below, considered either individually or according to all technically possible combinations:
- said video encoding is a space-time encoding H264
- the screen of said server is displayed by said client terminal on a screen according to a Remote Frame Buffer (RFB) protocol, such as a Virtual Network Computing (VNC) protocol,
- said real motion vector of said moved area is determined in the following cases:
  - horizontal or vertical scrolling of said moved area with a browser type application;
  - displacement of a graphical window of the operating system of said server;
  - transition from a slide to another in the case of a slideshow;
  - flash type animation.
- said client terminal is a video decoder;
- said current image and said real motion vector are initially encoded in an RGB format then undergo a YUV format transformation.
- said real motion vector is a two- or three-dimensional vector.

BRIEF DESCRIPTION OF THE DRAWINGS

Other features and advantages of the invention will become more apparent from the following description given below only by way of an illustrative and non-limitative example, with reference to the accompanying FIG. 1 which is a simplified schematic illustration of an encoding system according to the invention for the implementation of the encoding method in accordance with the invention.

DESCRIPTION OF THE PREFERRED EMBODIMENTS OF THE INVENTION

FIG. 1 represents an encoding system 100 according to the invention. The encoding system 100 comprises:
- an input data reception module 101,
- an input data processing module 102,
- a motion estimation module 105 (also called motion vector estimation module hereinafter),
- a motion compensation module 106,
- a subtracter 109 and an adder 110,
- a frequency transform module 112 and a reverse frequency transform module 115,
- a quantification module 113 and a reverse quantification module 114,
- a filter 116,
- a buffer 111,
- a reordering module 108,
- an entropic encoder 120.

The invention may be used in the field of video data broadcasting from a server to a client terminal. The server, which is generally a computer, is connected to the client terminal, for example a video decoder, through a network, for example a High Definition Multimedia Interface, (HDMI), WIFI or Ethernet type network. Consequently, the computer screen may be displayed by the client terminal on a TV screen according to a Remote Frame Buffer type protocol, for example a Virtual Network Computing, VNC, protocol. The server encodes what it broadcasts before sending it to the client terminal. The encoding carried out by the server is a space-time type encoding, such as H264 encoding: thus it is the server which incorporates the encoding system 100 according to the invention.

The reception module 101 is inputted with a predictive image $F_n$. $F_n$ corresponds to the current image of the screen of the server in its entirety. It should be noted that the invention only relates to the encoding of the predictive images, the intra-predictive encoding of images being proceeded with according to known techniques. Thus, for the sake of clarity of the drawing, the means required for the intra-predictive encoding have been voluntarily omitted.

The $F_n$ image is generally in a YUV12 format after having undergone an RGB-YUV transformation.

The reception module 101 is also inputted with information relating to the areas that have gone through a displacement (also referred to as moved areas hereinafter) in the $F_n$ image. The moved area is a rectangular area generally represented by a quadruplet (x, y, l, h): x and y respectively represent the abscissa and the ordinate of the top left point of the area, l represents the width of the rectangle and h is the height thereof. The information received by the server concerning each moved area is composed of the real motion vector $m=(mx, my)^T$ of this moved area, mx and my being the horizontal and vertical components of the real motion vector and T designating the transposition operator. Typically, this real vector may be obtained by the server via the programming interfaces of its graphical environment, also known as API (Application Programming Interfaces) or GUI (Graphical User Interface) of the software application running on the server and used by the client terminal or the operating system of the server, for example Windows™.

This real motion vector is known to the software application since the latter is behind the origination of the displacement of the area as a result of an event (typically an event brought about by a mouse click or a keystroke) of the end-user via the client terminal.

However in order to have the scale of this vector to calculate it in number of pixels, it might be necessary to reach the API of lower software layers. Thus, the system 100 will preferably rely on the operating system (Windows™) layer to recover the real vector in order to implement this encoding software accelerator, regardless of the applications which will benefit therefrom. By way of example, a JavaScript function of windows.scrollby (x-coord, y-coord) type of DOM Windows may be called upon; which will be called upon when a "downwards arrow" key on the client terminal is pressed: the function can provide the module of the motion vector:

$|m|=\sqrt{(mx^2+my^2)}$, the vector direction being vertically downwards.

The size of the rectangle can also be obtained by windows.innerHeight type and windows.innerWidth type functions.

In any event, the server may obtain values characterizing the real motion vector of the area moved by the user via the client terminal.

Typically, such a real motion vector for an area undergoing a displacement may be obtained in the frame of applications such as:
  horizontal or vertical scrolling of the moved area with a browser type application;
  displacement of a graphical window of the server operating system;
  transition from a slide to another in the case of slideshow;
  flash or Silverlight type animation.

The motion vector $m=(mw, my)^T$ coded in RGB format is also transformed into YUV 12 format.

The input data processing module 102 comprises:
  means 103 for dividing the current image F, into macroblocks,
  means 104 for allocating the real motion vector V to the macroblocks belonging to the moved area,
  means 118 for directly transmitting the real motion vector to the compensation module 106 without any estimation of the motion vectors by the estimation module 105, for the macroblocks belonging to the moved area,
  means 119 for only transmitting the macroblocks not belonging to the moved area to the motion estimation module 105.

Thus, a whole portion of the motion vector computations for the macroblocks to which module 104 has already allocated a real motion vector because of their belonging to a moved area is saved.

Thus, each current image $F_n$ to be encoded is divided by means 103 into macroblocks corresponding to an elementary rectangular area of the image having a variable size comprised between 4×4 and 16×16 pixels (going through 8×16, 8×8 pixels, . . . ).

Means 104 knowing the moved areas of the $F_n$ image as well as their real motion vectors make it possible to allocate to the macroblocks belonging to a moved area a same real motion vector. Consequently, means 119 will direct only the macroblocks not touched by a moved area towards the motion estimation module 105, the real motion vectors of the others macroblocks being directly transmitted to the motion compensation module 106 via means 118.

The function of the motion estimation module 105 is to find a macroblock of the current image $F_n$ in at least a previous image $F_{n-1}$ of the server screen in its entirety (it could also be a subsequent image in the case of a B image and even of a plurality of previous and/or subsequent images). When part of a previous image which resembles (according to a least-squares criterion, for example) the macroblock is found, a motion vector which corresponds to the difference between the position of the selected area and that of the macroblock is deduced therefrom.

The motion vectors which were retained by the estimation module (besides the real motion vectors transmitted by means 118) are transmitted towards the motion compensation module 106. Thus, a prediction error due to the fact that the retained area in the last image is not exactly equal to the analyzed macroblock is obtained. At the output of the motion compensation module 106, a predicted image P is obtained.

Then, subtracter 109 calculates a residual error $D_n$ between the pixels of $F_n$ and the predicted image P.

A frequency transform (Discrete Cosine Transform, DCT, type or Hadamard transform type) is applied via the frequency transform module 112 to each macroblock that have undergone a motion estimation as well as on the residual error $D_n$. This transform makes it possible to have a frequency representation of the modified areas.

The data from the frequency transform module 112 are then quantified (i.e., encoded on a limited number of bits) by the quantification module 113 to provide transformed and quantified parameters X. The function of the quantification module 113 is to define different quantification steps according to whether certain components will be judged to be visually significant or not; these quantification steps are defined in a quantification step table.

The reverse quantification module 114 recovers the transformed and quantified parameters X which then traverse the reverse frequency transform module 115 which operates a reverse frequency transform to recover a quantified version $D_n'$ of the residual error $D_n$; this quantified version $D_n'$ is then added to the macroblocks of the predicted area P by adder 110; the image outputted from adder 110 is then processed by the release filter to provide a rebuilt image $F'_n$ corresponding to a set of rebuilt areas having the same position, the same width and the same height as the modified areas. $F'_n$ is internally used by decoder 100 to estimate the quality of the encoding.

The quantified results X from the quantification module 113 are then reordered by the reordering module 108 to group the non null coefficients together so as to allow an effective representation of the other coefficients having a null value.

The data then undergo a last phase of entropic coding compression via the entropic encoder 120. The function of the entropic encoder is to re-encode differently the data so as to decrease the number of bits necessary to their encoding by approaching as closely as possible the minimum of theoretical bits (which is fixed by the entropy).

The entropic encoder 120 builds an output flow ⊔ in a Network Abstraction Layer (NAL) format defined to allow the use of the same video syntax in various network environments.

It will be noted that the means and modules described above can be either software or made from specific electronic circuits.

Obviously, the invention is not limited to the embodiment which has just been described.

In particular, the invention was more particularly described within the framework of the H264 coding but it may be used in any type space-time coding: which is for example the case for MPEG2 or VC1 coding (a video compression standard of the Society of Motion Picture and Television Engineers, SMPTE).

Moreover, it should be noted that the motion vector has been described as a two dimensional vector but it is also possible to use a three-dimensional motion vector, for example in the case of a graphic interface such as Aero™ which is the graphic interface of Windows Vista™ allowing the display of 3D effects.

Lastly, any means may be replaced by an equivalent means.

The invention claimed is:

1. A video encoding system for encoding consecutive images of a video sequence, the encoding of at least one current image ($F_n$) being operated with respect to at least one previous image or at least one subsequent image, or both at least one previous image and at least one subsequent image, ($F_{n-1}$) of said video sequence, said encoding system comprising one or more electronic circuits including:
    an input data reception means for receiving said current image ($F_n$) to be encoded and a non estimated real motion vector that is representative of an area of said current image that has moved within said current image ($F_n$);
    means for dividing said current image ($F_n$) into macroblocks;
    a data estimation means for estimating motion vectors depending on the macroblocks of said current image ($F_n$) and on said at least one previous image or said at least one subsequent image, or both said at least one previous image and said at least one subsequent image, ($F_{n-1}$);
    a motion compensation means for receiving motion vectors and for providing at least one predicted area;
    means for allocating said non estimated real motion vector to the macroblocks belonging to said moved area;
    means for transmitting said non estimated real motion vector directly to said motion compensation means without any estimation of the motion vectors by said data estimation means for said macroblocks belonging to said moved area, and
    a subtractor means for determining a difference between pixels of the current image ($F_n$) and the predicted area and for providing a residual error ($D_n$) corresponding to said determined difference.

2. The video encoding system according to claim 1, comprising means for only transmitting the macroblocks not belonging to said moved area to said data estimation means.

3. The video encoding system according to claim 1, comprising:
    a frequency transform means for applying a frequency transform on each macroblock processed by said data estimation means and on said residual error ($D_n$),
    a quantification means for quantifying data from said frequency transform means,
    an entropic encoder means for encoding data from said quantification means.

4. A video encoding method for encoding consecutive images of a video sequence, the encoding of at least one current image ($F_n$) being operated with respect to at least one image or at least one subsequent image, or both at least one previous image and at least one subsequent image, ($F_{n-1}$) of said video sequence, said method comprising:
    receiving said current image ($F_n$) to be encoded and a non estimated real motion vector that is representative of an area of said current image that has moved within said current image ($F_n$);
    dividing said current image into macroblocks;
    allocating said non estimated real motion vector to the macroblocks belonging to said moved area;
    estimating motion vectors depending on the macroblocks of said current image and of said at least one image or said at least one subsequent image, or both said at least one previous image and at least one subsequent image, said estimation being made only from the macroblocks not belonging to said moved area,
    said current image to be encoded being transmitted from a server to a client terminal, the encoding being carried out at the server and said non estimated real vector of the moved area of said current image being provided by a programming interface of a graphical environment of said server;
    providing a predicted area using the estimated motion vectors and the non estimated real motion vector, and
    determining a difference between pixels of the current image ($F_n$) and the predicted area and providing a residual error ($D_n$) corresponding to said determined difference.

5. The method according to claim 4, wherein the screen of said server is displayed by said client terminal on a screen according to a Remote Frame Buffer (RFB) protocol.

6. The method according to claim 4 wherein said video encoding is a space-time encoding H264.

7. The method according to claim 4, wherein said real motion vector of said moved area is determined in the following cases:
    horizontal or vertical scrolling of said moved area with a browser type application;
    displacement of a graphical window of the operating system of said server;
    transition from a slide to another in the case of a slideshow;
    flash type animation.

8. The method according to claim 4, wherein said client terminal is a video decoder.

9. The method according to claim 4, wherein said current image and said real motion vector are initially encoded in an RGB format then undergo a YUV format transformation.

10. The method according to claim 4, wherein said real motion vector is a two- or three-dimensional vector.

11. The method according to claim 5, wherein the Remote Frame Buffer (RFB) protocol is a Virtual Network Computing (VNC) protocol.

12. A video encoding system for encoding consecutive images of a video sequence, the encoding of at least one current image ($F_n$) being done with respect to at least one previous image or at least one subsequent image, or both at least one previous image and at least one subsequent image, $(F_{n-1})$ of said video sequence, said encoding system comprising one or more electronic circuits including:
- an input data reception means for receiving said current image $(F_n)$ to be encoded and a non estimated real motion vector that is representative of an area of said current image that has moved within said current image $(F_n)$;
- a divider means for dividing said current image $(F_n)$ into a plurality of macroblocks;
- a data estimation means for estimating motion vectors depending on the macroblocks of said current image $(F_n)$ and on said at least one previous image or said at least one subsequent image, or both at least one previous image and at least one subsequent image, $(F_{n-1})$;
- a motion compensation means for receiving motion vectors and for providing at least one predicted area;
- an allocating means for allocating said non estimated real motion vector to the plurality of macroblocks belonging to said moved area;
- a first transmitting means for transmitting said non estimated real motion vector directly to said motion compensation means without any estimation of the motion vectors by said estimation means for said plurality of macroblocks belonging to said moved area, and
- a subtractor means for determining a difference between pixels of the current image $(F_n)$ and the predicted area and for providing a residual error $(D_n)$ corresponding to said determined difference.

13. A video encoding system according to claim 12, comprising a second transmitting means for only transmitting the plurality of macroblocks not belonging to said moved area to said data estimation means.

14. A video encoding system according to claim 12, comprising:
- a frequency transform means for applying a frequency transform on each macroblock processed by said data estimation means and on said residual error $(D_n)$,
- a quantification means for quantifying data from said frequency transform means,
- an entropic encoder means for encoding data from said quantification means.

15. A video encoding system according to claim 12, wherein the motion compensation means is in direct communication with both the data estimation means and the first transmitting means so as to directly receive from said estimation means the estimated motion vector and to directly receive from the first transmitting means the non estimated real motion vector.

* * * * *

UNITED STATES PATENT AND TRADEMARK OFFICE
CERTIFICATE OF CORRECTION

PATENT NO. : 8,731,060 B2
APPLICATION NO. : 13/142551
DATED : May 20, 2014
INVENTOR(S) : Morard Page 1 of 1

It is certified that error appears in the above-identified patent and that said Letters Patent is hereby corrected as shown below:

In the Specification

Column 1, lines 6-10
delete "This application is the U.S. National Stage of PCT/FR2009/052193, filed November 16, 2009, which in tuna claims priority to French Patent Application No. 0859113, filed December 30, 2008, the entire contents of all applications are incorporated herein by reference in their entireties."

and insert -- This application is the U.S. National Stage of PCT/FR2009/052193, filed November 16, 2009, which in turn claims priority to French Patent Application No. 0859113, filed December 30, 2008, the entire contents of all applications are incorporated herein by reference in their entireties. --

Signed and Sealed this
Twenty-sixth Day of August, 2014

Michelle K. Lee
*Deputy Director of the United States Patent and Trademark Office*